United States Patent [19]
Yoshida et al.

[11] Patent Number: 5,227,824
[45] Date of Patent: Jul. 13, 1993

[54] ZOOM CAMERA AND METHOD OF AUTOMATIC ZOOMING AND FRAMING

[75] Inventors: Yutaka Yoshida; Hiroshi Komatsuzaki, both of Tokyo, Japan

[73] Assignee: Fuji Photo Film Co., Ltd., Kanagawa, Japan

[21] Appl. No.: 925,868

[22] Filed: Aug. 7, 1992

[30] Foreign Application Priority Data

Aug. 7, 1991 [JP] Japan ................. 3-222292

[51] Int. Cl.⁵ ................................ G03B 1/18
[52] U.S. Cl. .................. 354/195.12; 354/159; 354/94; 354/105; 354/167
[58] Field of Search ............. 354/195.12, 159, 94, 354/105, 167, 195.11

[56] References Cited

U.S. PATENT DOCUMENTS

| | | | |
|---|---|---|---|
| 4,733,263 | 3/1988 | Taniguchi et al. | 354/105 |
| 4,853,733 | 8/1989 | Watanabe et al. | 354/105 |
| 5,010,357 | 4/1991 | Misawa | 354/159 |
| 5,086,311 | 2/1992 | Naka et al. | 354/195.1 |
| 5,089,841 | 2/1992 | Yamada | 354/195.1 |
| 5,130,733 | 7/1992 | Taniguchi et al. | 354/195.12 |
| 5,132,715 | 7/1992 | Taillie | 354/105 |
| 5,151,726 | 9/1992 | Iwashita et al. | 354/105 |
| 5,159,377 | 10/1992 | Suzuki et al. | 354/195.12 |

Primary Examiner—Monroe H. Hayes
Attorney, Agent, or Firm—Young & Thompson

[57] ABSTRACT

A camera having a zooming device for controlling the focal length of a zoom lens in response to a zooming signal, and a print aspect ratio designation device for designating an aspect ratio of a photographic print to be made by trimming an original of a constant size. When the print aspect ratio designation device is given priority over the zooming device, the zooming device is activated conjointly with the print aspect ratio designation device, so as automatically to change the focal length of the zoom lens in accordance with the designation aspect ratio. When the zooming device is given priority over the print aspect ratio designation device, the print aspect ratio is automatically changed conjointly with the zooming device, so as to be matched with the selected focal length, independently of the print aspect ratio designated by the print aspect ratio designation device.

26 Claims, 7 Drawing Sheets

"L" SIZE FOCAL LENGTH F₁

"CINERAMA" FOCAL LENGTH F₁

"CINERAMA" FOCAL LENGTH F₂

ZOOM CAMERA AND METHOD OF AUTOMATIC ZOOMING AND FRAMING

BACKGROUND OF THE INVENTION

1. Field of the Invention

The present invention relates to a camera which has a zoom lens and a function for designating a print aspect ratio of a print concurrently with photographing, and more particularly to a camera wherein an effective angle of view of an effective picture area to be used for printing is maintained substantially constant, so as to maintain the condition of a primary subject within the effective picture frame substantially unchanged before and after changing the print aspect ratio or the focal length.

The invention also relates to a method of automatic framing in the camera.

2. Related Art

Recently, there have been 35 mm full-size format compact cameras which can take pictures in a panoramic size from which a panoramic print can be made. For example, "Cardia Travel Mini" (a trademark) is one such compact camera.

In such a variable-exposure-opening-type camera, pictures are usually taken within an exposure area that corresponds to a full-size frame, 24 mm×36 mm in size (aspect ratio 1.5). However when a panoramic print is desired, a pair of mask plates are inserted in an exposure opening corresponding to the full-size frame, so as to mask out the upper and lower portions of the exposure opening and provide a horizontally extended exposure area 13 mm×36 mm in size (aspect ratio about 2.8).

An original taken in this panoramic size is printed at a magnification which is about twice the magnification used for making a standard size print from the full-size original frame, thereby making a horizontally extended panoramic print.

The conventional variable-exposure-opening type cameras are provided with a frame display device in a view-finder for showing a photographic field that corresponds to the frame size so as to show the selected aspect ratio, during framing. On the other hand, if print size data are magnetically or photographically recorded on photographic film during photographing, and a photographic printer can read the print size data from the photographic film, it is possible to eliminate the mask member and make a panoramic print from the 24 mm×36 mm full-size original frame, by trimming or clipping the original frame to leave a 13 mm×36 mm panoramic area when the print size data read by the photographic printer designate the panoramic size. Only the 13 mm×36 mm area is printed at a higher magnification, thereby making a panoramic print. This fixed-exposure-opening-type camera has an advantage that no frame size changing member such as an LCD mask is necessary.

However, many types of recent compact cameras employ a zoom lens as the taking lens, and if the above-described print size designation function is incorporated in such a zoom camera, a problem would arise, namely, if the photographer first performs zooming so as to set a primary subject in a desirable size in a scene, and thereafter, designates the panoramic print size, the primary subject may vertically exceed the height of the panoramic print. In such a case, if the photographer still wishes a panoramic print, the photographer must perform zooming again, while referring to the display in the viewfinder, so that the whole portion of the primary subject desired to be taken is included within the range of the panoramic print. This is obviously cumbersome.

The just-described problem would be still more complicated if the zoom camera is provided with a print aspect ratio designating function, by which various print sizes having different aspect ratios, such as HDTV size (aspect ratio about 1.8), cinemascope size (aspect ratio about 2.3) and panoramic size (aspect ratio about 2.8) can be designated besides the standard size (aspect ratio 1.5). In this case, if the photographer wishes to give priority to zooming and designates secondarily an aspect ratio, it is necessary to select another appropriate aspect ratio by operating a print aspect ratio designating device after zooming. The framing operation becomes still more cumbersome.

OBJECTS OF THE INVENTION

In view of the foregoing, an object of the present invention is to provide a zoom camera having a print aspect ratio designating function, in which the primary subject is prevented from exceeding the printed area, without the need for cumbersome manual operation.

Another object is to provide a zoom camera having a print aspect ratio designating function, wherein, if the size of a primary subject does not match the size of an effective picture area to be printed, either the aspect ratio or the focal length is automatically changed, depending on the photographic purpose, so as to bring the primary subject and the effective picture area into harmony with each other.

SUMMARY OF THE INVENTION

To achieve the above objects, in a camera having a zooming device for controlling the focal length of a zoom lens in response to a zooming signal from a manually operable zoom switch, and a print aspect ratio designation device for designating a print aspect ratio of a photographic print to be made, the present invention activates the zooming device in cooperation with the print aspect ratio designation device, so as automatically to change the focal length of the zoom lens while maintaining the angle of view, that is, the angle subtended by the field of view, substantially constant before and after changing the print aspect ratio.

According to a preferred embodiment of the invention, the print aspect ratio is automatically change din cooperation with the zooming device, while maintaining the direction of view substantially constant before and after changing the focal length, so as to be matched with the selected focal length.

A camera according to the invention includes a mode selecting device for selecting either a frame priority mode or a zoom priority mode, wherein the print aspect ratio designation device has priority over the zooming device in the frame priority mode, whereas the zooming device has priority over the print aspect ratio designation device in the zoom priority mode, and a control unit for automatically controlling either the print aspect ratio or the focal length respectively in accordance with the focal length or the print aspect ratio.

When the frame priority mode is selected, the zooming device is automatically controlled by the control unit to change the focal length in accordance with the designated print aspect ratio. When the zoom priority mode is selected, the control unit automatically changes the print aspect ratio in accordance with the focal length set by the zooming device.

According to the invention, when the print type or the aspect ratio is manually changed, the focal length is automatically changed, but when the focal length is manually changed, the aspect ratio of the print frame is automatically changed, while maintaining the angle of view substantially constant before the change of the print aspect ratio or the focal length, taking the fact into consideration that the condition of the primary subject in a finished photographic print varies depending on the focal length and the aspect ratio. Therefore, it becomes possible to prevent the primary subject from partly exceeding a finished print, without the need for complicated or cumbersome operation.

BRIEF DESCRIPTION OF THE DRAWINGS

The above and other objects and advantages of the present invention will become apparent from the following detailed description of the preferred embodiments when read in connection with the accompanying drawings, wherein like reference numerals designate like parts throughout the several views, and wherein.

DETAILED DESCRIPTION OF THE PREFERRED EMBODIMENTS

Figure 1A:
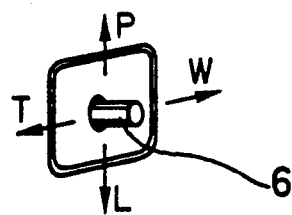
FIG. 1A is a fragmentary view of that portion of the rear of the camera designated by a broken-line rectangle in FIG. 1.

First, the meaning of the angle of view used in this specification will be described. As set forth above, there are two types of frame changing or selecting methods, namely, using a variable exposure opening type and using a fixed exposure opening type. In the variable exposure opening type, a mechanical mask member or an LCD panel mask member is disposed in front of the exposure opening of a camera, for actually changing the original frame size in accordance with the print aspect ratio. In the fixed opening type, every original is taken in a full-size defined by the fixed exposure opening, and an area of the original that corresponds to the print aspect ratio, for example, a panoramic size area, is trimming-printed.

Accordingly, the aspect ratio of the original is always equal to the aspect ratio of the print, and the angle of view is determined based on the original frame size and the focal length of the taking lens. On the other hand, in the fixed exposure opening type, because the originals are always taken full-size, independently of the print aspect ratio, it is impossible to use the term "angle of view" in the above-described original meaning in the description of the present invention. Therefore, we use the phrase "an effective picture area" for the area to be trimming-printed within the full-size original, and the phrase "an effective angle of view" for an angle of view that is determined based on the size of the effective picture area and the focal length. Hereinafter, we will use the term "angle of view" not only in the original meaning with respect to the variable exposure opening type camera, but also to mean the effective angle of view with respect to the fixed exposure opening type.

Next, the angle of view $\theta$ will be described.

The tangential angle of view $\tau$ that corresponds to the angle of view $\theta$ is defined as follows:

$$\tau = \tan \theta \tag{1}$$

When a picture frame has a horizontal angle of view $\theta h$, a vertical angle of view $\theta v$, and a diagonal angle of view $\theta d$, the corresponding tangential angles of view are defined as follows:

$$\tau h = \tan \theta h \tag{2}$$

$$\tau v = \tan \theta v \tag{3}$$

$$\tau d = \tan \theta d \tag{4}$$

These tangential angles of view $\tau h$, $\tau v$ and $\tau d$ may also be defined using the horizontal and vertical lengths of the picture frame and the focal length F of the taking lens, as follows:

$$\tau h = Nh/F \tag{5}$$

$$\tau v = Nv/F \tag{6}$$

$$\tau d = \{(\sqrt{Nv^2 + Nh^2})\}/F \tag{7}$$

There are commonly provided four types of picture frames: "Panorama", "Cinerama", "HDTV (high definition TV)" and "L". The sizes (mm) of these four types of frames on photographic film strips having a width 26 mm are standardized as follows:

| Panorama | Ph = 37.7 (horizontal length) | aspect ratio 2.8 |
|---|---|---|
| | Pv = 13.2 (vertical height) | |
| Cinerama | Ch = 37.7 (horizontal length) | aspect ratio 2.3 |
| | Cv = 16.4 (vertical height) | |
| HDTV | Hh = 37.7 (horizontal length) | aspect ratio 1.8 |
| | Hv = 21.2 (vertical height) | |
| L | Lh = 31.0 (horizontal length) | aspect ratio 1.5 |
| | Lv = 21.2 (vertical height) | | wherein the L size frame corresponds to a full-size frame taken on 135-type film having a width 35 mm, and a photographic print of the same format as made from the 35 mm full-size frame can be made from the L size frame.

Figure 2:
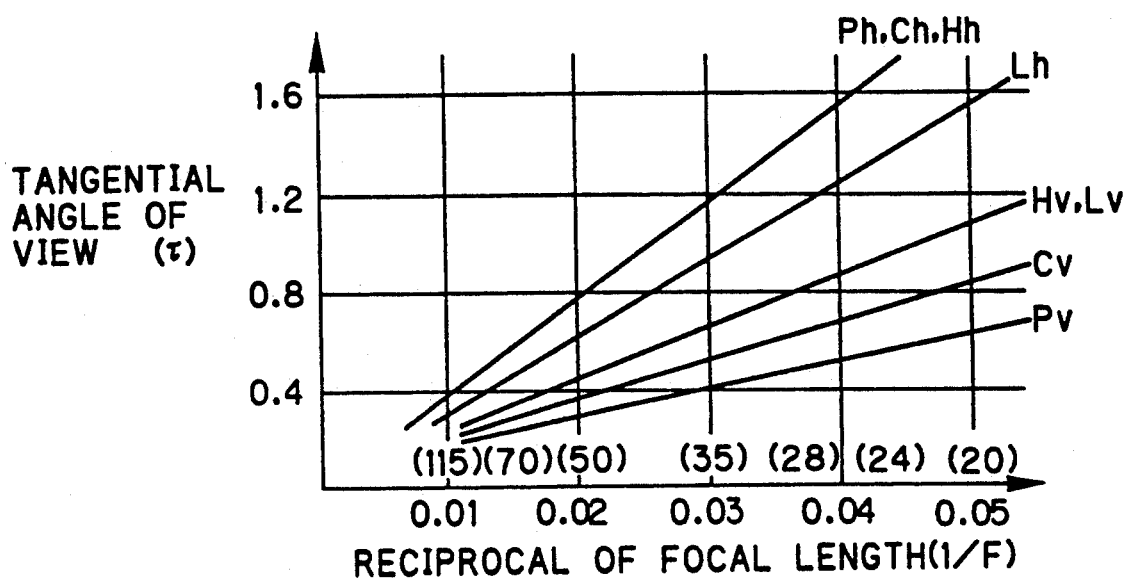
FIG. 2 is a graph showing the relationship between the tangential angle of view and the reciprocal of the focal length.

The corresponding tangential angles of view $\tau$ in the horizontal and vertical directions of the frames are shown in FIG. 2 in relation to the reciprocal of the focal length F. It is to be noted that the values shown in parentheses designate the corresponding focal lengths F.

Figure 3:
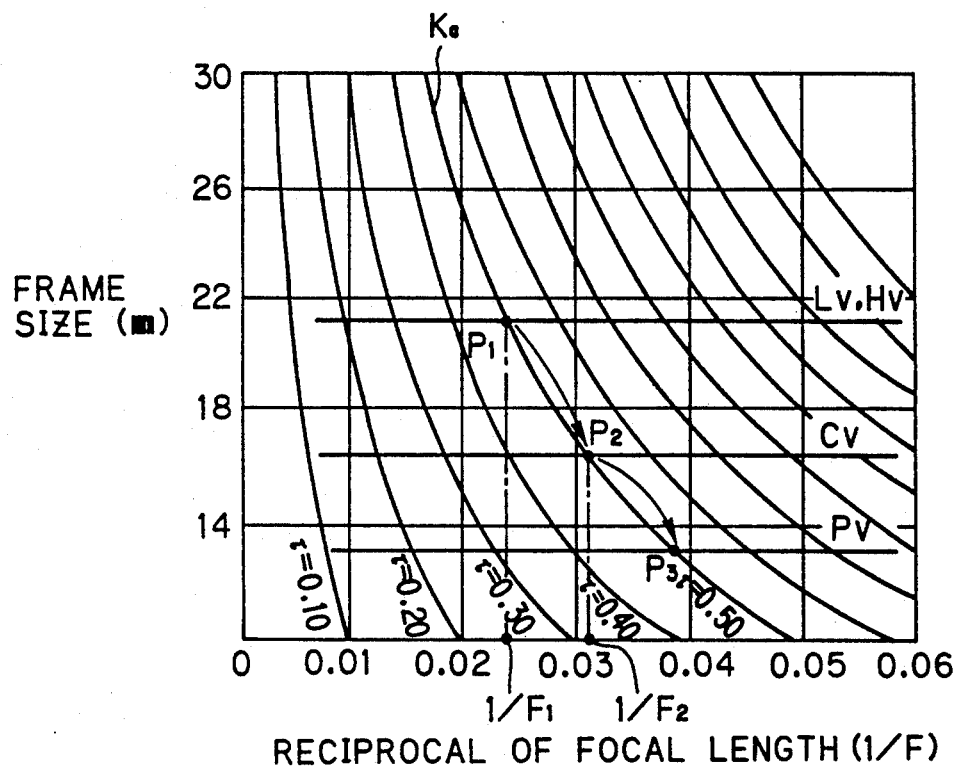
FIG. 3 is a graph for explaining the focal length change in a frame priority mode.

On the other hand, FIG. 3 shows curves of equivalent tangential angles of view, wherein the abscissa axis designates the reciprocal of the focal length F and the vertical axis designates the vertical height of the picture frame recorded on photographic film. The curves of equivalent tangential angle of view indicate the combinations of the vertical height with the focal length at which the tangential angle of view τ is equal. Therefore, in order to change the frame size or the focal length while maintaining the tangential angle of view τ constant, it is necessary to maintain a tangential angle of view τa which is defined by the previous frame size and the previous focal length, equal to a tangential angle of view τb which is defined by the changed frame size and the changed focal length, namely:

$$\tau a = \tau b \quad (8)$$

In other words, it is possible to maintain the tangential angle of view τ unchanged, by changing the frame size and/or the focal length along a corresponding one of the curves shown in FIG. 3.

An embodiment of the invention will be described hereinafter on the basis of the vertical height of the picture frames (the effective picture area), because the change of the vertical height of the effective picture area has a great influence on the print aspect ratio. Of course, there may be cases wherein it is better to use the horizontal length or the diagonal angle of view as a basis when frame sizes are different from the above-described four sizes. It is also possible to make the basic direction selectable from among the horizontal, vertical and diagonal directions. Furthermore, it is possible to change the basic direction depending on the camera posture (vertical or horizontal posture).

Figure 1:
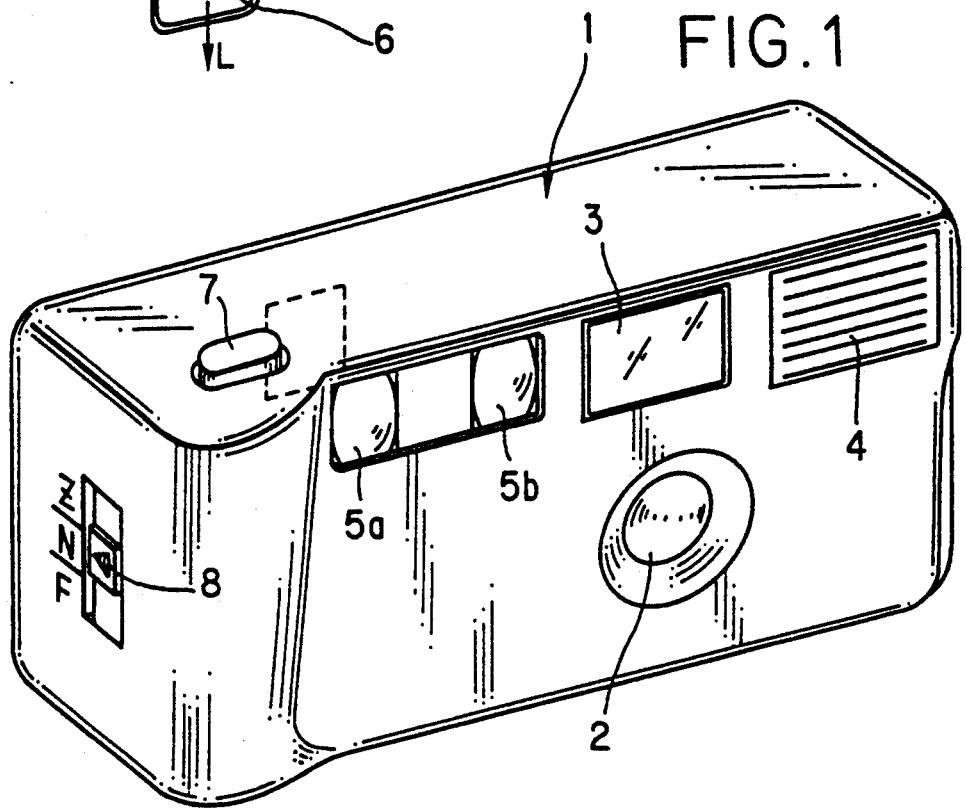
FIG. 1 is a front perspective view of a camera according to an embodiment of the invention.

FIG. 1 shows a variable-exposure-opening-type zoom camera 1 according to an embodiment of the invention, wherein the camera 1 has a zoom lens 2, a viewfinder 3, a flash unit 4, and a pair of rangefinder windows 5a and 5b for projecting and receiving rays for distance measurement. As shown by dashed lines in FIG. 1, the camera 1 has a switching section disposed on the rear wall thereof. As shown in detail in FIG. 1A, the switching section has a lever 6 or a joystick-type input switch which can be moved in four directions T, W, P and L. When the lever 6 is pushed in the direction T, the focal length of the zoom lens 2 is increased until the lens is set in the telephoto position. When the lever 6 is pushed in the direction W, the focal length of the zoom lens 2 is decreased until the lens is set in a wide-angle position. On the other hand, when the lever 6 is pushed in the direction P, the frame type designated for printing is sequentially changed so as to increase the aspect ratio of the photographic print to be made, for instance, in the sequence "L", "HDTV", Cinerama" and "Panorama". When the lever 6 is pushed in the direction L, the designated frame type is sequentially changed in the reverse order to the above-described order, so as successively to decrease the aspect ratio of the photographic print to be made.

The camera 1 also has a mode selection button 8 disposed on one side wall thereof. When the button 8 is set at a position indicated by Z, F or N, the camera 1 is set in a zoom priority mode, a frame priority mode, or a normal mode, respectively. The operations in these modes will be described later.

Figure 4:
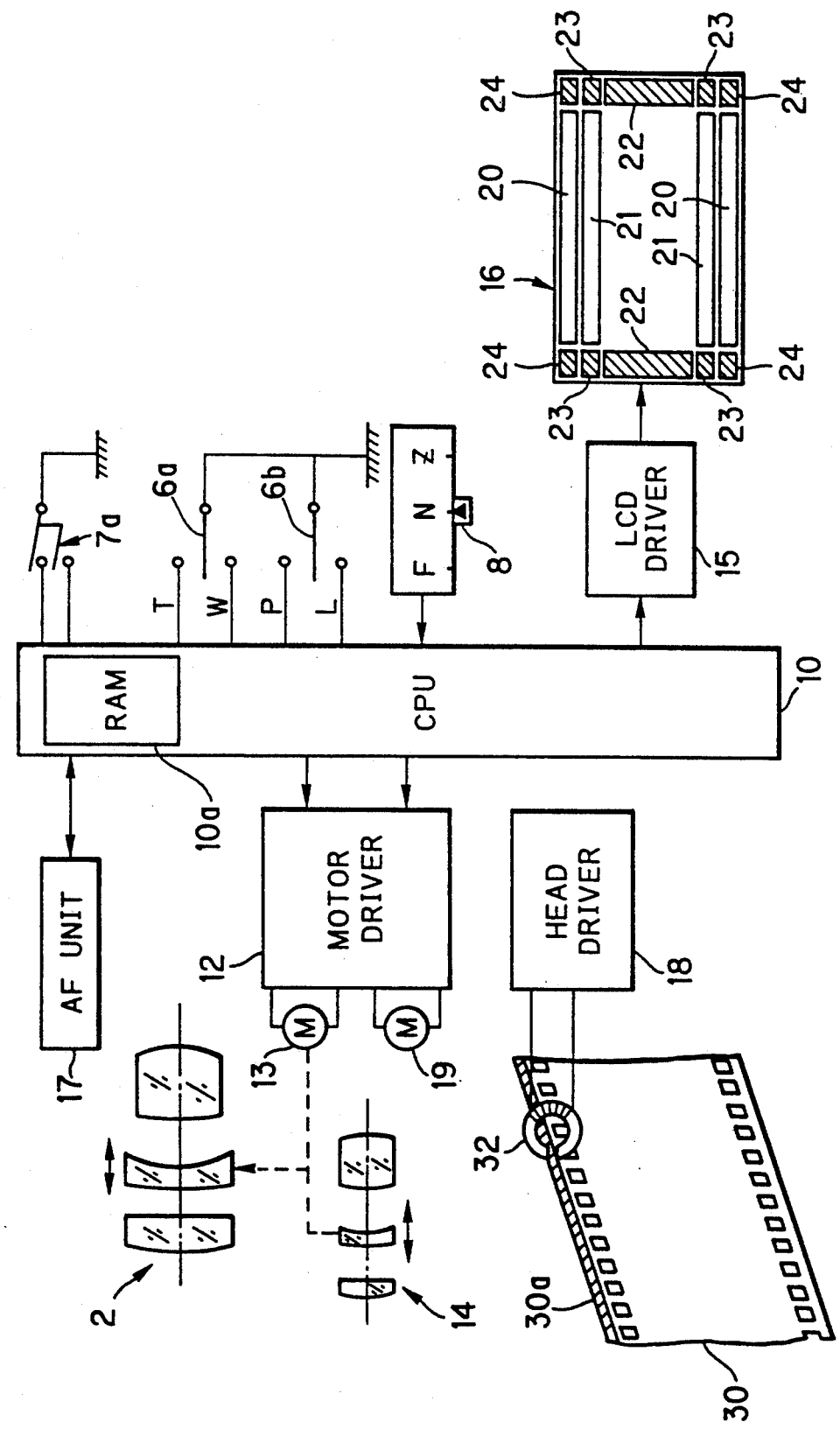
FIG. 4 schematically shows the circuitry of the camera.

Referring to FIG. 4 showing the electric circuitry of the camera, a CPU 10 controls the entire operation of the camera 1, to which operation signals indicative of a half-depression or a full-depression of the release button 7 are applied through a release switch 7a. The operation of the lever 6 is detected by a zoom switch 6a and a frame switch 6b. A zoom motor 13 is driven by a zoom signal from the zoom switch 6a through a motor driver 12, so as to change the focal length of the zoom lens 2 and the magnification of the optical system 14 of the viewfinder 3. The CPU 10 drives an LCD driver 15 in response to a frame signal from the frame switch 6b, so as to actuate an LCD panel 16 which is disposed in the optical system 14 of the viewfinder 3. An autofocus unit 17 outputs a distance measurement signal to the CPU 10, upon a half-depression of the release button 7.

The LCD panel 16 includes five segments 20, 21, 22, 23 and 24 which become transparent or opaque in a manner as shown in the following Table 1, in conjunction with the change of the frame type.

TABLE 1

| Frame Type | Transparent Segment | Opaque Segment |
|---|---|---|
| panorama | 22 | 20, 21, 23, 24 |
| cinerama | 21, 22, 23 | 20, 24 |
| HDTV | all segments | none |
| L | 20, 21 | 22, 23, 24 |

The CPU 10 is further connected to a head driver 18 for driving a magnetic head 32. When the motor 19 starts one-frame advance of photographic film 30 after each exposure. The head driver 18 drives the magnetic head 32, so as to record coded data indicating the frame type selected for the preceding exposure, onto a magnetic recording layer 30a of the photographic film 30. The coded data is read by a magnetic reader incorporated in a photographic printer, so as to use the coded data in setting a trimming range and a print magnification as well.

It is possible to optically record the coded data by using a number of LEDs or the like that corresponds to the number of bits necessary for the coded data. In this case, it may be possible to record the coded data before film advance.

Figure 5:
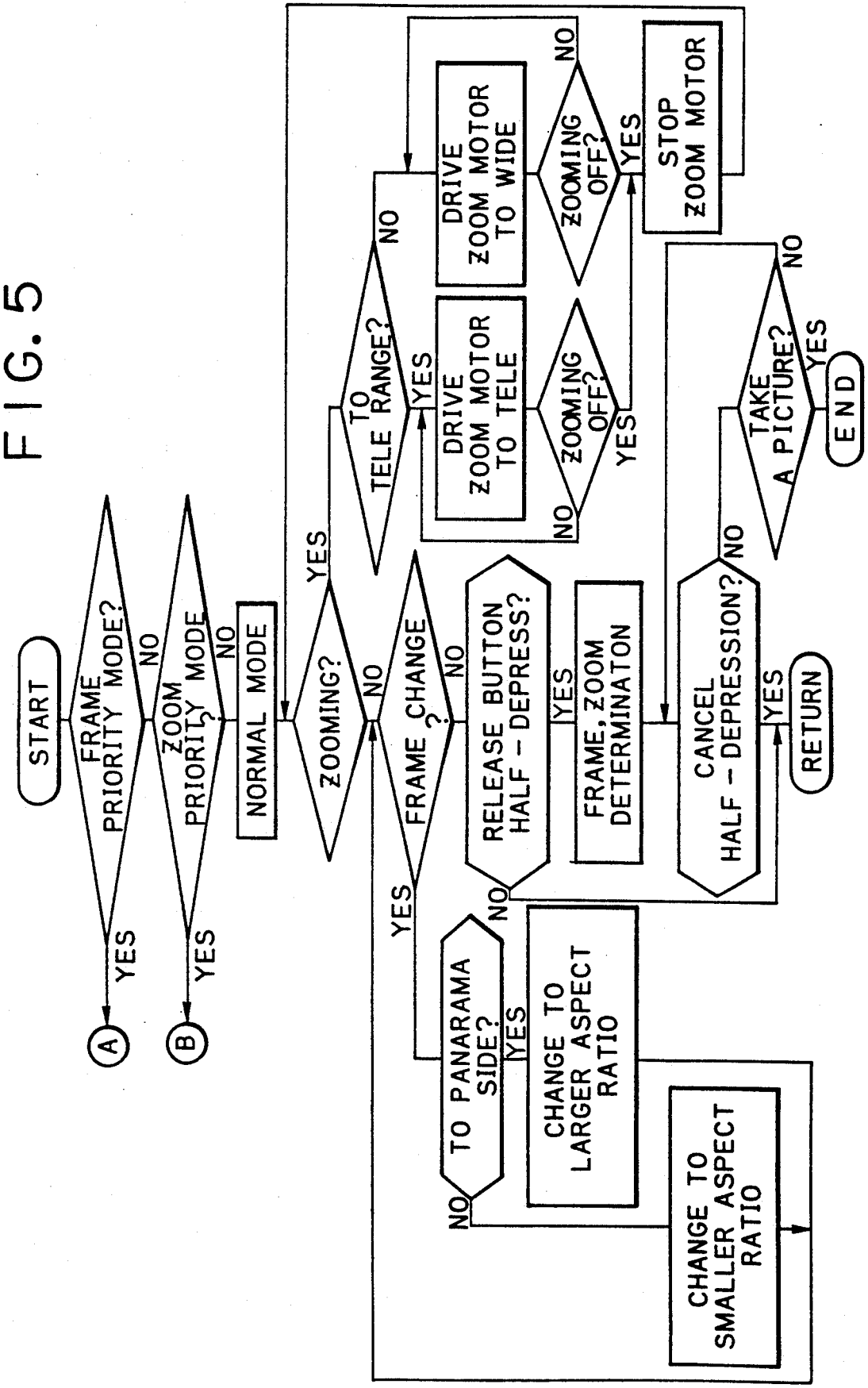
FIGS. 5, 6 and 7 show a flow chart of the operation of the camera.
Figure 6:
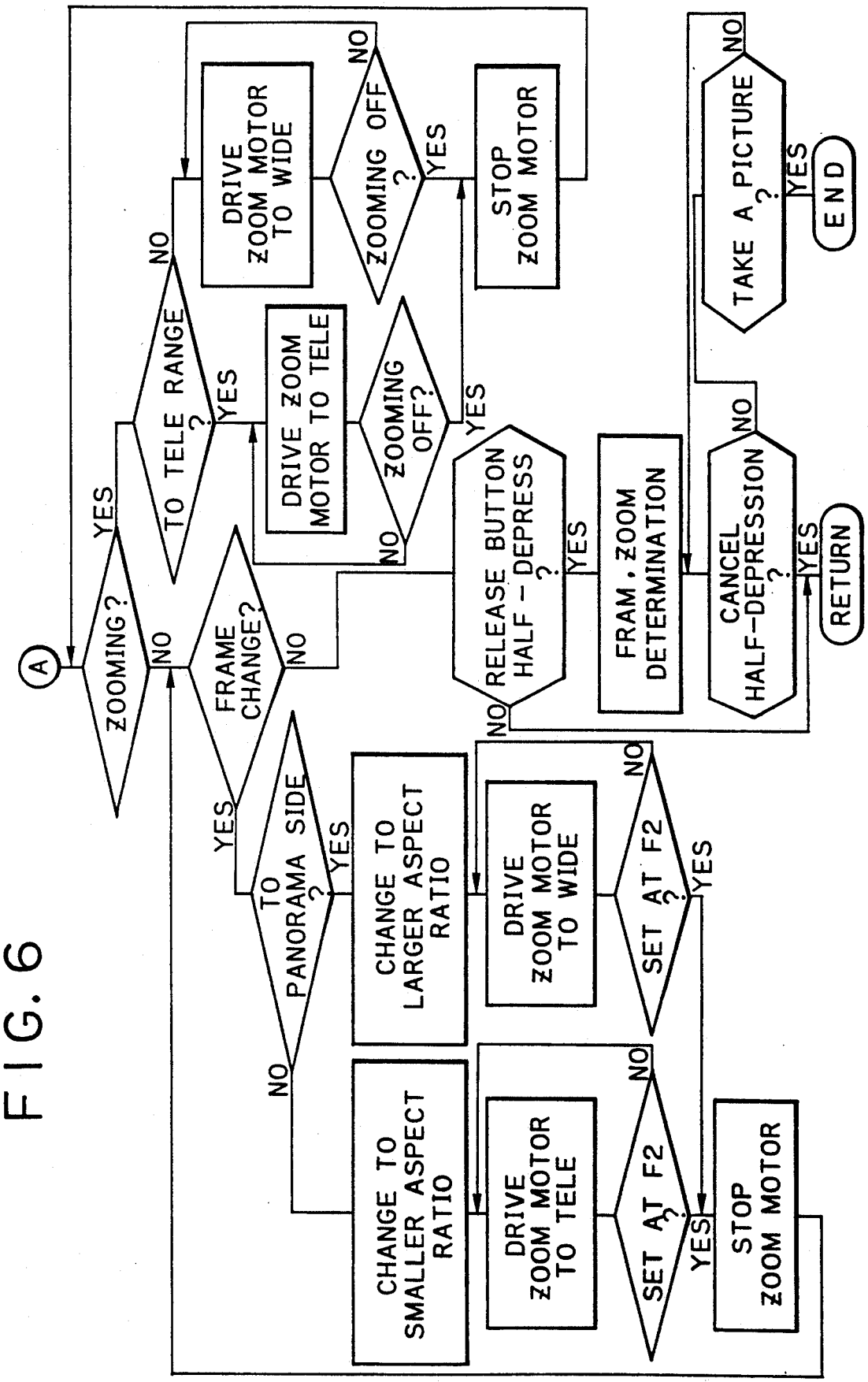
Figure 7:
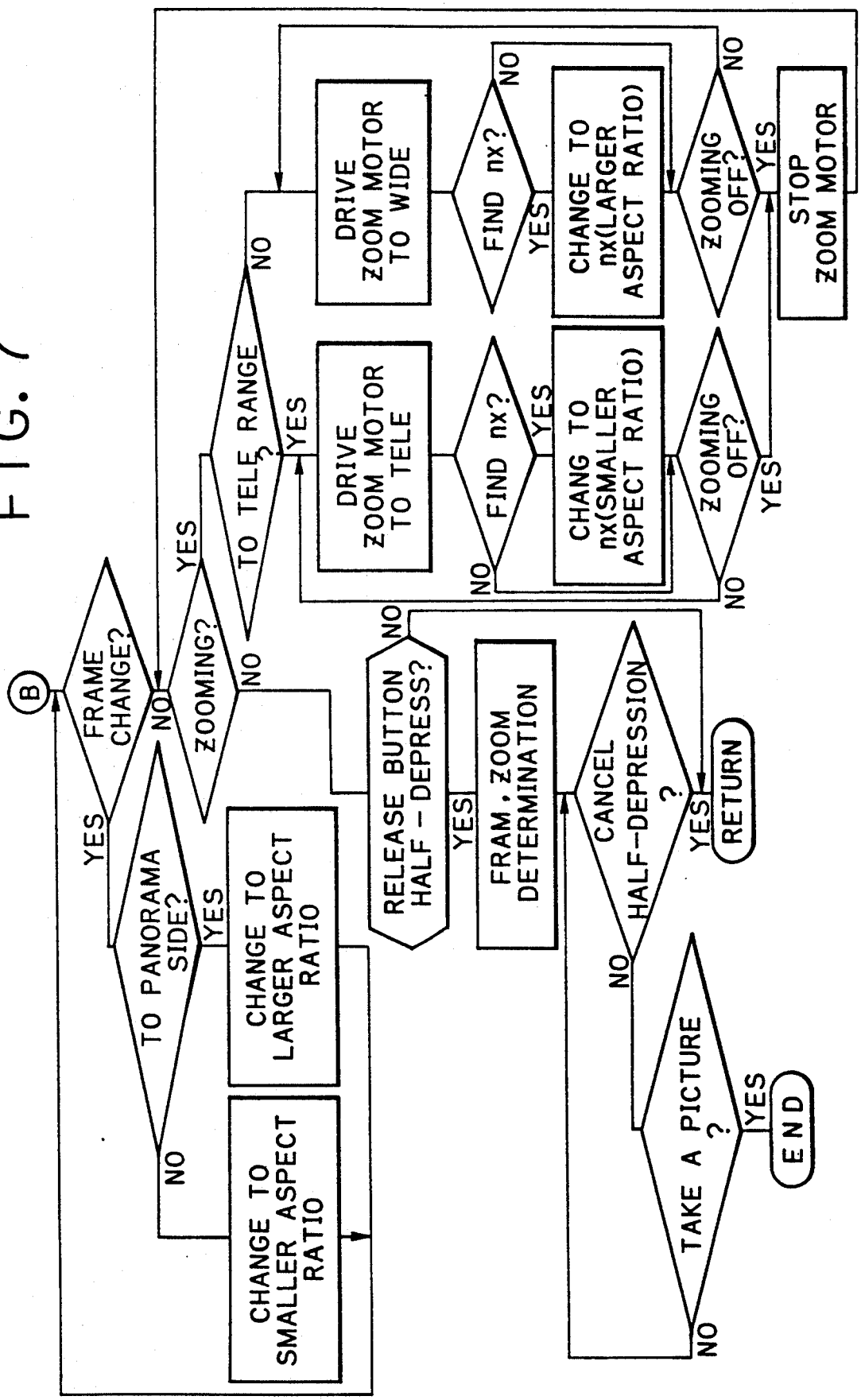

The fundamental operation of the above-described camera is illustrated in FIGS. 5 to 7.

When the mode selection button 8 is set at the position indicated by N, the camera is set in a normal mode. In the normal mode, the lever 6 can be moved in a selected one of the four directions P, L, W and T, so as to change the frame type and/or perform zooming, independently of each other. The change of frame type can be visually confirmed through the viewfinder 3 thanks to the LCD panel 16. The zooming can also be visually confirmed through the viewfinder 3. Therefore, the photographer can actuate the release button 7 after confirming the scene to be taken at the selected frame type and zooming direction.

Upon a half-depression of the release button 7, the autofocus system 17 is activated to perform focusing of the zoom lens 2, and a code that corresponds to the selected frame type is written in the RAM 10a. When the release button 7 is further depressed to the full, an exposure is executed, thereby recording a full-size original frame corresponding to e.g. the HDTV size (37×21.2 mm).

After the exposure, the motor 19 is driven to advance the photographic film 30 by one frame. When the speed of advance of the photographic film 30 becomes constant, the CPU 10 drives the magnetic head 32 through the head driver 18, so as to write the coded data indicative of the frame type and stored in the RAM 10a on the magnetic recording layer 30a. In this way, it becomes possible to read out the coded data from the magnetic recording layer 30a during printing, so as to determine the print trimming range and print magnification based on the coded data. A negative mask and a paper mask of the photographic printer are moved in accordance with the determined trimming range, so as to mask the original frame except the effective picture area. Simultaneously, a printing lens of the photographic printer is adjusted in accordance with the determined print magnification, so that a photographic print having an aspect ratio selected in photographing is made.

Next, the operation in the frame priority mode, which is selected by positioning the mode selection button 8 at the index F, will be described. In the frame priority mode, a final aspect ratio of the photographic print to be made is determined prior to the focal length. Therefore, when the photographer selects a frame type, the focal length of the zoom lens 2 is automatically changed so as to maintain the angle of view (the effective angle of view) unchanged from a value that has been set before the change of frame type.

For brevity of description, the following definition is applied:

| | |
|---|---|
| nj | (j = 0, 1, 2, ...) designates the type of frame; |
| n | designate generally the frame; |
| [n] | represents the total number of frame types; |
| Nvj | represents the vertical height of the picture frame nj; |
| Fmax | represents the maximum focal length; |
| Fmin | represents the minimum focal length; |
| minimum{g(p)} condition | represents the minimum value of a function g(p) which is obtained when a variable p is changed within a range that meets a given condition; |
| p \|\| whenmin({g(p)}) condition | represents a value of the variable p at which the minimum value of the function g(p) is obtained; |
| maximum {g(p)} condition | represents the maximum value of a function g(p) which is obtained when a variable p is changed within a range that meets a given condition; |
| p \|\| whenmax{g(p)} condition | represents a value of the variable p at which the maximum value of the function g(p) is obtained. |

Assuming that the zoom lens 2 has a focal length F1 before the photographer changes the frame type, and that the photographer changes the frame from a type n1 to another type n2, the CPU 10 calculates a focal length F2 of the zoom lens 2 for the frame type n2, based on the vertical heights Nv1 and Nv2 of the frames n1 and n2, and the focal length F1, that has been written in the RAM 10a at the time of the change of frame type, according to the following equation (9):

$$F2 = F1 \times Nv2/Nv1 \qquad (9)$$

It is to be noted that equation (9) is derived from the above-described equations (6) and (8).

After calculating the focal length F2 in this way, the CPU 10 drives the motor 13 so as to adjust the focal length of the zoom lens 2 to the focal length F2.

Figure 8A:
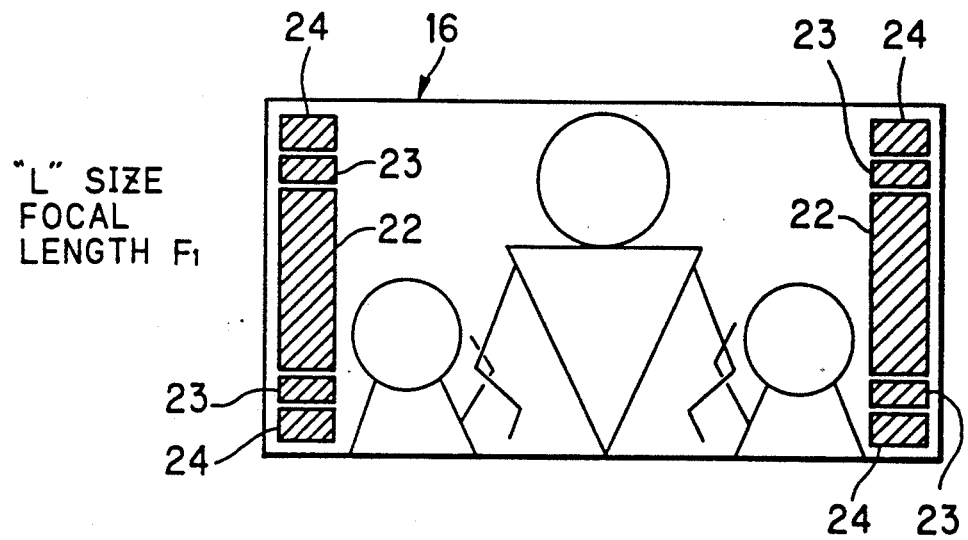
FIGS. 8A, 8B and 8C schematically show the change of field of view in accordance with the type of frame selected.
Figure 8B:
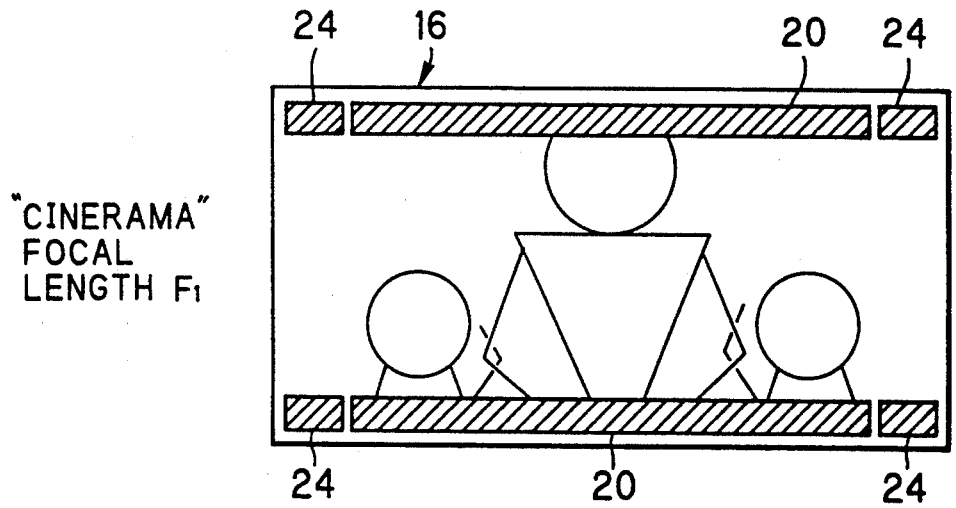
Figure 8C:
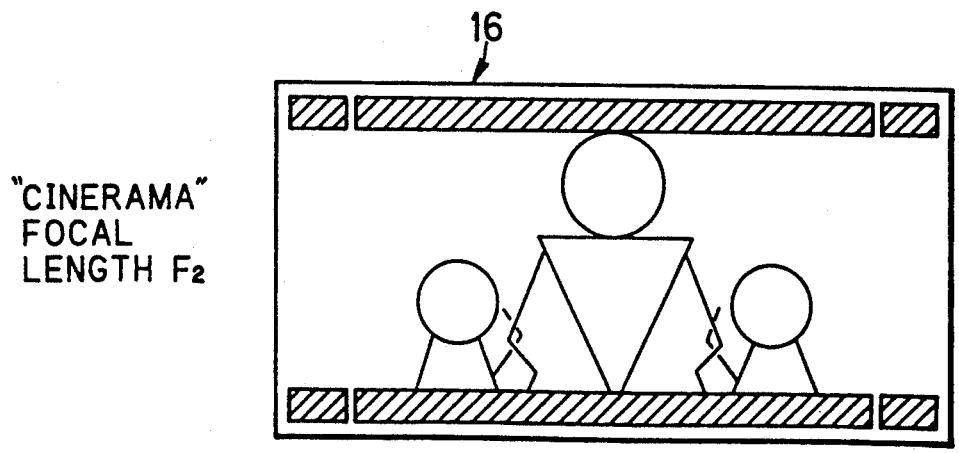

For example, if the previous frame n1 is of "L" size, and the changed frame n2 is of "cinerama" size, the field of the viewfinder 3 is changed in a manner as shown in FIGS. 8A, 8B and 8C. FIG. 8A shows a condition wherein framing is performed using the frame "L" while the zoom lens 2 is set at the focal length F1. Thereafter when the frame is changed to the "cinerama" type, the segments 20 and 24 of the LCD panel 16 become opaque, and the segments 22 and 23 that have previously been opaque become transparent. As a result, upper and lower portions of the primary subject are shielded by the segments 20, as shown in FIG. 8B. However, because the zoom lens 2 is automatically zoomed to have the focal length F2, the whole portion of the primary subject is of "cinerama" size. It is to be noted that the original frame containing the cinerama size effective picture area is recorded in the HDTV size on the photographic film 30, and the effective picture area only is printed at an enlarged magnification, so as to make a cinerama print.

If, for example, the tangential angle of view $\tau$ was 0.5 for the previous "L" size frame, the above-described zooming operation corresponds to changing the focal length along an equivalent tangential angle curve Ka from a point P1 to a point P2 in FIG. 3. Namely, the focal length at the point P1 is F1, and the focal length at the point P2 is F2. In this way, when the frame type is changed on the basis of a tangential angle of view set for the previous frame type, zooming is performed so as to maintain that tangential angle of view. As a result, the primary subject desired to be taken will not exceed the print frame even after the trimming from the "L" size to the "cinerama" size.

As will be understood from the graph of FIG. 3, if the frame type is further changed from the "cinerama" size to the "panorama" size, zooming is performed so as to change the focal length from the point P2 to a point P3 along the equivalent tangential angle curve K2. When the release button is actuated after deciding the composition in this way, an exposure is performed in the same way as for the normal mode, and coded data indicative of the selected frame type are magnetically recorded during the one-frame film advance after the exposure.

When the zoom priority mode is selected by setting the mode selecting button 8 at the position indicated by Z, the frame n is automatically changed during zooming, so as to maintain unchanged the angle of view (effective angle of view), that has been set before zooming. Specifically, if the focal length of the zoom lens 2 is changed from a value F1 to another value F2 when a frame type n1 has been selected, another frame type nx is calculated according to the following equation (10):

$$nx = nj | whenmin \{abs (Nv1/F1 - Nvj/F2)\} \qquad (10)$$

wherein j<[n] and "abs (y)" is a function representing an absolute value of a value y.

Figure 9:
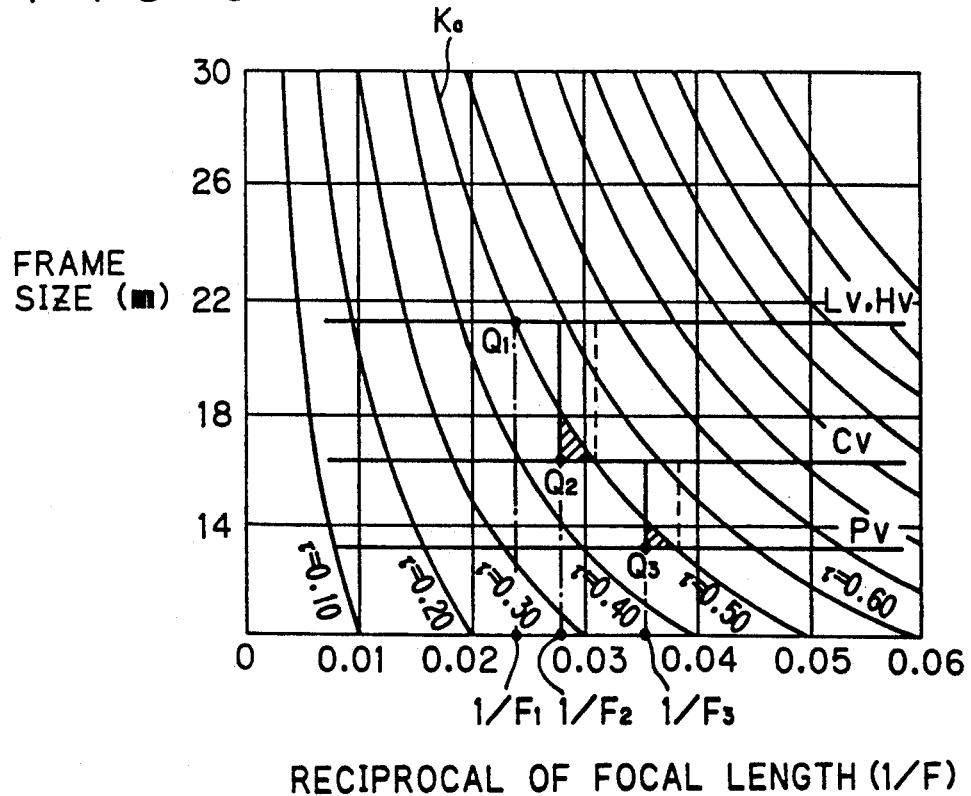
FIG. 9 is a graph for explaining the frame size change in a zoom priority mode.

After the frame type nx is calculated, the frame is automatically set to the frame type nx during zooming, and the CPU 10 drives the LCD driver 15 so as to make each pair of the segments 20 to 24 transparent or opaque in accordance with the selected frame nx. For example, if the zoom lens 2 is previously set at a focal length F1 when the "L" size frame is selected, and this setting condition corresponds to a point Q1 on the equivalent tangential angle curve Ka, as shown in FIG. 9, the setting point is changed from the point Q1 to a point Q2 when the focal length of the zoom lens 2 is changed from the value F1 to a value F2, during zooming.

Specifically, the tangential angle of view $\tau$ is 0.50 at the point Q1. And if the focal length is changed to F2 while maintaining the frame type unchanged from the "L" size, the tangential angle of view $\tau$ is changed to a value about 0.60, which is markedly different form the previous tangential angle of view $\tau$0.50. Therefore, the frame type is changed from the "L" size to the "cinerama" size, thereby to reduce the tangential angle of view $\tau$ to about 0.50. As a result, the tangential angle of view τ becomes approximately equal to the previous value. It is to be noted that while the focal length F can be continuously changed during zooming, the frame type n can be changed only gradually. Therefore, it is possible only gradually to correct the tangential angle of view τ in the zoom priority mode. However, by setting more frame types n, it becomes possible to correct the tangential angle of view τ more closely in the zoom priority mode.

Because the frame type is automatically changed so as to maintain the previous tangential angle of view τ unchanged between before and after zooming, a primary subject desired to be taken is prevented from exceeding the print frame. As shown by a point Q3 in FIG. 9, if the zoom lens 2 is further zoomed to a focal length F3 in the zoom priority mode, then the frame type is automatically changed to the "panorama" size, so that the tangential angle of view is maintained at about τ0.50. An exposure is performed in the same way as in the normal mode and the frame priority mode.

Because the point Q2 or Q3 determined according to the equation (10), is disposed below the equivalent tangential angle curve Ka corresponding to the tangential angle of view τ0.50, the photographing is performed at a smaller angle of view than the previously set angle of view, so that it is possible that a portion of the primary subject will be excluded form the photographed picture.

In order to prevent such an error, it is preferable to use the following equation (11) for frame type change:

$$20nx = nj | \text{whenmin} \{abs(Nv1/F1 - Nvj/F2)\}$$
$$Nv1/F1 - Nvj/F2 > 0 \quad (11)$$

This equation (11) is adapted to eliminate the hatched areas in FIG. 9. Thereby, the frame type is changed according to a curve shown by dashed line of FIG. 9, if the previously set tangential angle of view τ is 0.50. This modification makes it possible to change the frame type without reducing the angle of view, while maintaining τ as constant as possible.

In the zoom priority mode, it is also possible to manually change the frame type in an ordinary manner.

According to the above-described preferred embodiments of the invention wherein the frame size is changed in the vertical direction of the frame upon changing the aspect ratio, it becomes possible to provide variety of framing during photographing, because the frame priority mode provides a function for changing the frame type as if the horizontal angle of view were also changed.

According to the invention, it is possible to set an optional number [n] of type or size of the frame n.

It is also possible to compound the frame priority mode and the zoom priority mode, so as automatically to change either the focal length or the frame type in accordance with a change of frame type or focal length, respectively.

Although the above-described embodiment relates to only a fixed-exposure-opening-type camera wherein every original frame is taken full-size, and an effective picture area is trimming-printed, so as to make a photographic print having a desirable aspect ratio, it is of course possible to apply the invention to a variable-exposure-opening-type camera which has an exposure opening mask member for recording an original frame at an aspect ratio that corresponds to a designated print aspect ratio. Because the size of the original frame corresponds to the print aspect ratio in the variable exposure opening type camera, it is unnecessary to record the data of designated print aspect ratios on the photographic film or the like.

As described so far, according to the invention, either the focal length or the frame type, that is, the aspect ratio of the print, is automatically changed respectively when the frame type is manually changed, or when the focal length is manually changed, so as to maintain the angle of view substantially constant, taking into consideration the fact that the photographic field contained in a finished photographic print varies depending on the focal length and the aspect ratio. Therefore, it becomes possible to prevent the primary subject desired to be photographed from partly exceeding a finished print frame, without the need for complicated or cumbersome operation.

While the present invention has been described in detail above with reference to a preferred embodiment shown in the drawings, it will be apparent to those skilled in the art that various changes and modifications of the present invention are possible within the scope of the following claims.

What is claimed is:

1. In a camera having a zooming device for changing the focal length of a zoom lens in response to a zoom signal from a manually operable zooming switch, and a print aspect ratio designation device for designating a print aspect ratio of a photographic print to be made from a photographic original; the improvement comprising control means for controlling said zooming device conjointly with said print aspect ratio designating device, so as to change the focal length of said zoom lens while maintaining an angle of view substantially constant before and after changing the print aspect ratio.

2. A camera as recited in claim 1, further comprising a viewfinder on said camera, a frame display device for displaying a frame in a field of view of said viewfinder, said frame display device indicating a taking field that corresponds to an area of the original to be printed, said viewfinder having an optical system which is controlled conjointly with said zoom lens for visually designating the taking field changed with the change of the focal length.

3. A camera as recited in claim 2, wherein said frame display device includes a liquid crystal display panel disposed in said viewfinder and controlled conjointly with the designated print aspect ratio.

4. A camera as recited in claim 2, wherein the original frame has a constant size, and said photographic print having a finally selected print aspect ratio is made by trimming said original during printing, said camera further comprising a recording device for recording data of a finally selected print aspect ratio on a recording medium.

5. A camera as recited in claim 4, wherein said recording device includes a magnetic head for magnetically recording said data of finally selected print aspect ratio on a magnetic recording layer of photographic film on which said original is present.

6. A camera as recited in claim 1, further comprising means for selecting said print aspect ratio from among a plurality of predetermined print aspect ratios.

7. A camera as recited in claim 6, wherein said plurality of predetermined print aspect ratios corresponds to at least 35 mm full-size format, HDTV size, cinerama size and panorama size.

8. A camera as recited in claim 1, further comprising mode selecting means for selecting either a frame priority mode or a zoom priority mode, wherein said control means automatically controls said zooming device in accordance with the designated print aspect ratio in said frame priority mode, whereas in said zoom priority mode, said control means controls said print aspect ratio designation device conjointly with said zooming device, so as to maintain an angle of view substantially constant before and after the change of the focal length set by said zooming device.

9. A camera as recited in claim 8, wherein the print aspect ratio is change din said zoom priority mode, so as to maintain the angle of view equal to or greater than a value that has been set before said manually operable zoom switch is operated.

10. A camera as recited in claim 8, wherein there is further provided in said camera a normal mode wherein said control means is inactivated.

11. In a camera having a zooming device for changing the focal length of a zoom lens in response to a zoom signal from a manually operable zooming switch, and a print aspect ratio designation device for designating a print aspect ratio of a photographic print to be made from a photographic original; the improvement comprising control means for controlling said print aspect ratio designation device conjointly with said zooming device, so as to maintain an angle of view substantially constant before and after changing the focal length of said zoom lens.

12. A camera as recited in claim 11, wherein the original frame has a constant size, and said photographic print having a finally selected print aspect ratio is made by trimming said original frame in printing, said camera further comprising a recording device for recording data of finally selected print aspect ratios on a recording medium.

13. A camera as recited in claim 11, wherein said print aspect ratio is selectable from among a plurality of predetermined print aspect ratios.

14. A camera as recited in claim 13, wherein said plurality of predetermined print aspect ratios includes at least 35 mm full-size format, HDTV size, cinerama size and panorama size.

15. A camera as recited in claim 13, wherein said control means controls said print aspect ratio designation device, so as to select one of said predetermined print aspect ratios depending on the focal length, while maintaining a substantially constant angle of view that has been set before said manually operable zooming switch is operated to change the focal length.

16. A camera as recited in claim 11, wherein the print aspect ratio is changed, so as to maintain the angle of view at least equal to a value that has been set before said manually operable zoom switch is operated.

17. A camera as recited in claim 16, further comprising a viewfinder on said camera, a frame display device for displaying a frame in a field of view of said viewfinder, said frame display device indicating a taking field that corresponds to an area of the original to be printed, said viewfinder having an optical system which is controlled conjointly with said zoom lens for visually designating the taking field changed with the change of the focal length.

18. A method of automatic framing in a zoom camera having a zoom lens and a viewfinder and a function of designating a print aspect ratio of a photographic print to be made from an original, comprising the steps of:

A. setting an angle of view of said camera;
B. thereafter manually designating a first print aspect ratio;
C. then automatically changing the focal length of said zoom lens so as to maintain substantially constant said angle of view; and
D. displaying in the field of view of said viewfinder a frame that indicates a taking field that corresponds to an area of the original to be contained in the photographic print having said first print aspect ratio.

19. A method as recited in claim 18, wherein said step C is performed in accordance with the following equation:

$$F2 = F1 \times Nv2/Nv1$$

wherein F1 represents a first focal length of said zoom lens that has been set before said step B, F2 represents a second focal length to be set in said step C, Nv1 represents a first vertical height of a first printed area of the original that corresponds to a photographic print having a second print aspect ratio that has been set before said step B, and Nv2 represent a second vertical height of a second printed area of the original that corresponds to a photographic print having the first print aspect ratio designated in step B.

20. A method of automatic framing in a zoom camera having a zoom lens and a function of designating a print aspect ratio of a photographic print to be made from an original, comprising the steps of:

A. setting an angle of vie of said camera;
B. selecting either a frame priority mode or a zoom priority mode;
C. performing the following steps in said frame priority mode:
C-1. manually designating a first print aspect ratio; and
C-2. thereafter, automatically changing the focal length of said zoom lens so as to maintain substantially constant said angle of view unchanged that has been set before said print aspect; and
D. performing the following steps in said zoom priority mode:
D-1 manually changing the focal length of said zoom lens; and
D-2. thereafter, automatically changing the print aspect ratio so as to maintain substantially constant said angle of view.

21. A method as recited in claim 20, further comprising the step of displaying a frame in a field of view of a viewfinder of said camera that indicates a taking field that corresponds to an area of the original to be printed.

22. A method as recited in claim 20, wherein the original has a constant size, said method further comprising the step of recording data of a finally selected print aspect ratio.

23. A method as recited in claim 20, wherein said step C-2 is performed in accordance with the following equation:

$$F2 = F1 \times Nv2/Nv1$$

wherein F1 represents a first focal length of said zoom lens that has been set before said step C-1, F2 represents a second focal length set in said step C-2, Nv1 represents a first vertical height of first printed area of the original that corresponds to a second print aspect ratio that has been set before said step C-1, and Nv2 represents a second vertical height of a second printed area of the original that corresponds to the first print aspect ratio designated in step C-1.

24. A method as recited in claim 20, wherein said step D-2 is performed in accordance with the following equation:

$$nx = nj \mid whenmin \{abs(Nv1/F1 - Nvj/F2)\} \; j < [n]$$
$$(j = 0, 1, 2, 3, \ldots)$$

wherein nx represents a print having a print aspect ratio to be selected in said step D-2, nj represents a print having one of a plurality of predetermined print aspect ratios, [n] represents the total number of said predetermined print aspect ratios, $\{abs(Nv1/F1 - Nvj/F2)\}$ is a function representing an absolute value of a variable $(Nv1/F1 - Nvj/F2)$, F1 represents a first focal length that has been set before said step D-1, F2 represents a second focal length set in said step D-1, Nv1 represents a first vertical height of a first printed area of the original that corresponds to a print aspect ratio that has been set before said step D-1, and Nvj represent a second vertical height of a second printed area of the original that corresponds to the print nj, and nj|whenmin $\{abs(Nv1/F1 - Nvj/F2)\}$ represents the minimum value of the function $\{abs(Nv1/F1 - Nvj/F2)\}$ which is obtained when the variable $(Nv1/F1 - Nvj/F2)$ is changed within a range that meets the condition $j < [n]$.

25. A method as recited in claim 20, wherein said step D-2 is performed so as to maintain said angle of view at least equal to a value that has been set before said step D-1.

26. A method as recited in claim 25, wherein said step D-2 is performed in accordance with the following equation:

$$nx = nj \mid whenmin \{abs(Nv1/F1 - Nvj/F2)\} \; j < [n]$$
$$(j = 0, 1, 2, 3, \ldots) \; (Nv1/F1 - Nvj/F2) > 0$$

wherein nx represents a print having a print aspect ratio to be selected in said step D-2, nj represents a print having one of a plurality of predetermined print aspect ratios, [n] represent the total number of said predetermined print aspect ratios, $\{abs(Nv1/F1 - Nvj/F2)\}$ is a function representing an absolute value of a variable $(Nv1/F1 - Nvj/F2)$, F1 represents a first focal length that has been set before said step D-1, F2 represents a second focal length set in said step D-1, Nv1 represents a first vertical height of a first printed area of the original that corresponds to a print aspect ratio that has been set before said step D-1, and Nvj represent a second vertical height of a second printed area of the original that corresponds to the print nj, and nj|whenmin $\{abs(Nv1/F1 - Nvj/F2)\}$ represents the minimum value of the function $\{abs(Nv1/F1 - Nvj/F2)\}$ which is obtained when the variable $(Nv1/F1 - Nvj/F2)$ is changed within a range that meets the conditions $j < [n]$ and $(Nv1/F1 - Nvj/F2) > 0$.

* * * * *